March 1, 1927.
T. P. BLAIR
FLOOR HEATER
Filed March 11, 1925
1,619,593
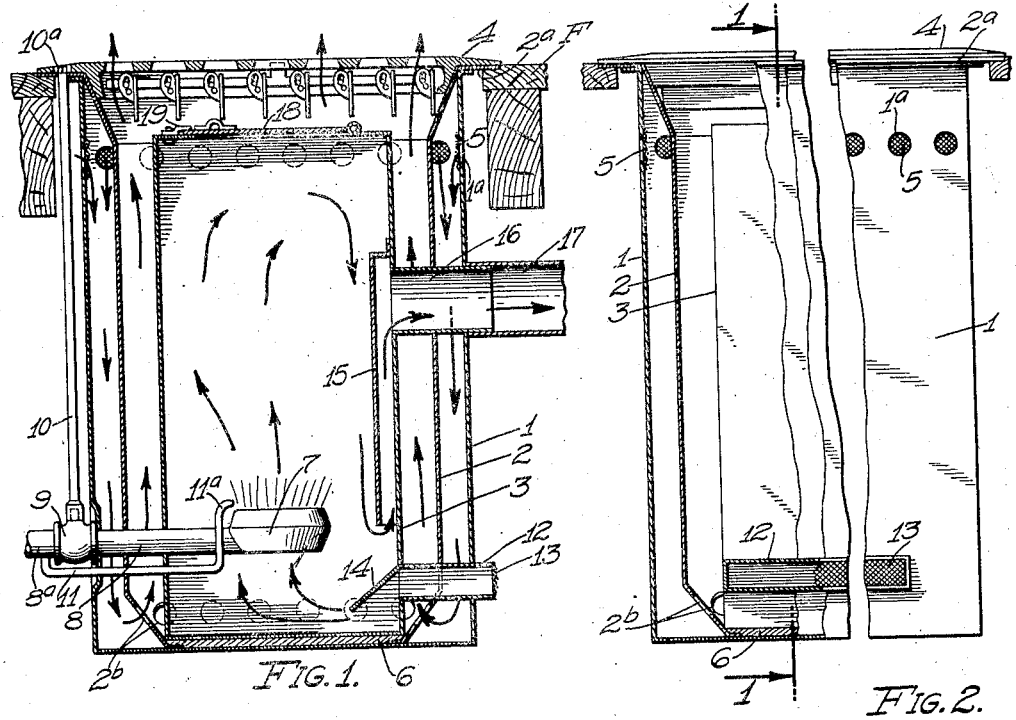
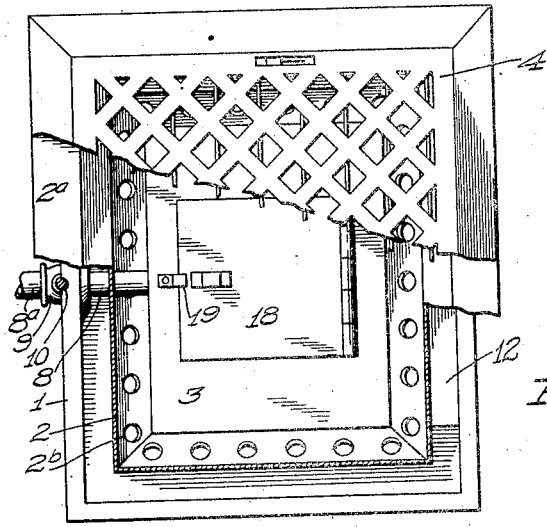
Inventor
THOMAS P. BLAIR.
By A. B. Bowman
Attorney Patented Mar. 1, 1927.

1,619,593

UNITED STATES PATENT OFFICE.

THOMAS P. BLAIR, OF SAN DIEGO, CALIFORNIA.

FLOOR HEATER.

Application filed March 11, 1925. Serial No. 14,698.

My invention relates to a gas floor heater, and the objects of my invention are: First, to provide a heater of this class whereby only pure fresh air, adapted to pass through the heater, is permitted to enter the room in which the heater is located; second, to provide a heater of this class in which the cool pure fresh air entering the heater at the upper outer portion thereof is adapted to cool the outer side walls thereof and at the same time be heated in its passage downwardly to the lower end of the heater from which end the air is adapted to rise and impinge against the hot outer walls of the firebox and be heated to a relatively high degree prior to its discharge from the upper end of the heater into the room; third, to provide a heater of this class having a centrally positioned firebox provided with an air inlet opening at its lower end for supplying oxygen to the burner positioned therein and which is also provided with a discharge opening near said lower end, said discharge opening of the firebox being so positioned as to keep the hottest gases within the firebox at all times and to force the hot gases downwardly against the side walls thereof before being discharged through the discharge opening, thereby creating efficient heating means for the pure fresh air impinging thereagainst in its passage upwardly through and out of the heater; fourth, to provide as a whole a novelly constructed gas floor heater, and fifth, to provide a heater of this class which is simple and economical of construction, durable, efficient, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a sectional elevational view of my gas floor heater, taken through 1—1 of Fig. 2; Fig. 2 is a fragmentary side elevational view thereof, with certain parts and portions broken away and in section to facilitate the illustration, and Fig. 3 is a top view thereof, also showing certain parts and portions thereof broken away and in section to facilitate the illustration.

Like characters of reference refer to similar parts and portions throughout the several views of the drawings.

My heater in its preferred form of construction consists essentially of three casings 1, 2 and 3, the latter positioned respectively within the former. The upper end of the casing 2, positioned within casing 1, diverges outwardly and connects with the upper end of the outer casing 1 and also extends outwardly therefrom forming a flange $2^a$ for supporting and securing the heater on and to the floor F. At the upper open end of the casing 2 is positioned the foraminous grate 4. Near the upper end of the side walls of the outer casing 1 is provided a plurality of ports $1^a$ which are adapted to supply pure fresh air to the space between the casings 1 and 2. Over the ports $1^a$ are secured screens 5 for excluding mice and other animal life from the interior of the heater. The lower end of the casing 2 is inwardly diverging and is secured at said lower end to the bottom of the outer casing 1. In the inclined or inwardly diverging walls of the casing 2 is provided a plurality of ports $2^b$ to permit the passage of air from the lower end of the space between the casings 1 and 2 to the space between the casings 2 and 3, as shown best in Figs. 1 and 2.

The casing 3, forming the firebox, is supported at its lower end on and insulated from the bottom of the outer casing 1, there being provided an insulating material 6 between the bottoms of the outer casing 1 and the firebox casing 3. Positioned near the lower central portion of the firebox is a burner 7 which is supported on a conductor 8 extending through the side walls of the casings 1, 2 and 3, said conductor supplying fuel gas to the burner 7. In the conductor 8, outside of the outer casing 1, is positioned a control valve 9 which is actuated by a rod 10 secured to the valve stem thereof and extending upwardly through the outer flanges of the casing 2 and the grate 4. The upper end of the rod 10 is provided with a square portion $10^a$ adapted to receive a key for rotating the rod 10 and actuating the valve 9. To the supply conductor $8^a$, at the opposite end of the valve 9 from the conductor 8, is connected a pilot tube 11 having a pilot burner 11ª at its end contiguous to the burner 7.

Fresh air or oxygen is supplied to the lower end of the firebox by means of a duct 12 extending through the lower ends of the side walls of the casings 1, 2 and 3. Said duct is provided at its outer end with a screen 13 and at the upper edge of its inner end with an inwardly and downwardly extending baffle plate 14, which plate is adapted to direct the fresh air to the bottom of the firebox from which it passes upwardly toward the burner 7. Intermediate the upper and lower ends of the side walls of said casings is positioned another duct or flue 16 which is adapted to carry away the products of combustion from the firebox to the atmosphere, the outer end of the flue 16 being connected to a flue 17 for directing the products of combustion outside of the building. To prevent the hot gases from being directly discharged into the flue 16, I have provided a baffle plate 15 on the inner side of and spaced from the wall of the firebox or casing 3, which is adapted to direct the gases of combustion downwardly to the lower edge thereof and thence upwardly against the outer wall of the firebox and through the flue 16.

To conveniently light the pilot burner 11ª from the room I have provided a cover 18 at the upper end of the firebox or casing 3, said cover being pivotally mounted thereon at one edge and held in a downward position against the top of the firebox, by means of a latch 19.

It is obvious from this construction, as illustrated in the drawings and disclosed in the foregoing specification, that I have provided a gas floor heater as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a gas floor heater, an outer casing, outwardly extending flange means at the upper end of the casing for supporting the latter on the floor of a room, and provided in the side wall thereof, and near its upper end with openings connecting the interior of the casing with fresh air, not from said room, an inner casing positioned in the outer casing and spaced from the side walls thereof, and a fire box casing positioned within and spaced from said inner casing, said inner casing being provided with a plurality of ports at the lower ends of its side walls connecting the space between the inner and outer casings with a space between the inner and the fire box casings, and the openings, in the outer casing communicating with the fresh air, through said ports with said room.

2. In a gas floor heater, an outer casing, an inner casing positioned therein and spaced therefrom, said casings adapted to be supported at their upper ends on a floor, a firebox casing positioned within and spaced from said inner casing, a fresh air duct communicating with the lower end of said firebox casing, a burnt gas flue connected with said firebox intermediate the upper and lower ends thereof, a baffle member positioned at the inner end of said fresh air duct for directing the air therefrom to the bottom and near the middle of said firebox, and another baffle member extending from said flue to near the bottom of said firebox for directing the gases of combustion downwardly in the firebox before being discharged.

3. In a gas floor heater, an outer casing, an inner casing positioned therein and spaced therefrom, said casings adapted to be supported at their upper ends on a floor, a firebox casing positioned within and spaced from said inner casing, said outer casing being provided with a plurality of ports near its upper end and said inner casing being provided with a plurality of ports at its lower end connecting the space between said inner and outer casings with the space between said inner and firebox casings, a fresh air duct communicating with the lower end of said firebox casing, a burnt gas flue connected with said firebox intermediate the upper and lower ends thereof, a baffle member positioned at the inner end of said fresh air duct for directing the air therefrom to the bottom of said firebox, and another baffle member extending from said flue to near the bottom of said firebox for directing the gases of combustion downwardly in the firebox before being discharged.

4. In a gas floor heater, an outer casing, an inner casing positioned therein and spaced therefrom, said casings adapted to be supported at their upper ends on a floor, a firebox casing positioned within and spaced from said inner casing, a fresh air duct of the width of the firebox casing extending through said outer and inner casings and into said firebox casing, and a baffle member of the width of said firebox casing connected with the upper inner edge of said duct and extending inwardly and downwardly therefrom.

5. In a floor heater, an outer casing, an inner casing positioned therein and spaced at its side walls therefrom, a firebox casing positioned within and spaced from said inner casing, said outer casing being provided with air inlet ports near its upper end and said inner casing being provided with ports at its lower end, a fresh air inlet duct extending through all of said casings into and communicating with the lower end of said firebox, a burnt gas discharge flue extending through all of said casings adapted to connect said firebox with the atmosphere, and a baffle member extending across said firebox from said flue to the lower portion of said firebox.

In testimony whereof, I have hereunto set my hand at San Diego, California, this 27th day of February, 1925.

THOMAS P. BLAIR.